United States Patent
Suginaka

(10) Patent No.: US 8,261,970 B2
(45) Date of Patent: Sep. 11, 2012

(54) WIRELESS PAYMENT SYSTEM HAVING LONG RANGE CREDITING AND SHORT RANGE PAYMENT APPROVAL

(76) Inventor: Junko Suginaka, Tokyo (JP)

( * ) Notice: Subject to any disclaimer, the term of this patent is extended or adjusted under 35 U.S.C. 154(b) by 310 days.

(21) Appl. No.: 12/450,693

(22) PCT Filed: Apr. 11, 2007

(86) PCT No.: PCT/JP2007/057967
§ 371 (c)(1),
(2), (4) Date: Oct. 7, 2009

(87) PCT Pub. No.: WO2008/129628
PCT Pub. Date: Oct. 30, 2008

(65) Prior Publication Data
US 2010/0044428 A1      Feb. 25, 2010

(51) Int. Cl.
G06F 17/00      (2006.01)
G06K 7/00      (2006.01)
G06K 7/08      (2006.01)
(52) U.S. Cl. .................. 235/375; 237/440; 237/451
(58) Field of Classification Search .................. 235/375, 235/440, 451
See application file for complete search history.

(56) References Cited

U.S. PATENT DOCUMENTS 7,780,081 B1 *  8/2010  Liang ........................... 235/383
2004/0030601 A1 *  2/2004  Pond et al. .................... 705/16

FOREIGN PATENT DOCUMENTS

| JP | 2002-63527 A | 2/2002 |
| JP | 2005-267165 A | 9/2005 |
| JP | 2006-23951 A | 1/2006 |
| JP | 2006-195921 A | 7/2006 |

OTHER PUBLICATIONS

International Search Report mailed on Jul. 3, 2007.

* cited by examiner

Primary Examiner — Thien M. Le
Assistant Examiner — Toan Ly
(74) Attorney, Agent, or Firm — Rader, Fishman & Grauer PLLC

(57) ABSTRACT

The present invention provides an electronic payment system with which even without an operation for payment by a customer who has a card etc. for electronic payment, credit processing can be performed in advance based on personal identification information of the card etc. and therefore, at the time of payment at a register, communications with a host are omitted, and a payment can be made in a short time. The electronic payment system detects an ID symbol of a portable telephone 1 comprising the IC card installed inside by middle-distance communication functions 12 and 31, introduces authentication data and a usable upper limit amount of the user from a payment server 4 in the shop server 3 and stores and credits these in advance, and when a payment terminal 2 detects an IC card ID symbol of the IC card 11, the IC card 11 is authenticated by using the authentication data stored in the shop server 3, and a payment of purchase is made within the usable upper limit amount.

4 Claims, 3 Drawing Sheets

WIRELESS PAYMENT SYSTEM HAVING LONG RANGE CREDITING AND SHORT RANGE PAYMENT APPROVAL

TECHNICAL FIELD

The present invention relates to an electronic payment system, specifically, an electronic payment system with which a payment can be made in a short time at a register even when credit information is inquired to the outside.

BACKGROUND ART

Conventionally, instead of payment in cash, electronic payment systems using credit cards, debit cards, or electronic money cards, etc. have been known. At the time of payment, if necessary information is inquired to a host of an account system, time for communications must be made, and the payment takes time, so that a system is known in which by receiving ID information of a card in response to a customer's operation performed when a customer enters a shop, credit information is inquired to the host and acquired, and credited in advance, and communications with the host are omitted at the time of payment at a register, and payment is made in a short time (for example, refer to Patent Literature 1).
[Patent Literature 1] JP, 2002-063527, A

SUMMARY OF INVENTION

Technical Problem

With the above-described payment system, when a customer enters a shop, the customer is credited in advance, and at the time of payment at a register, communications with a host are omitted, and a payment can be made in a short time, however, the customer is required to transmit ID information of a card to the shop by handling the card when the customer enters the shop. As a customer's normal psyche, it is rather rare that a customer enters a shop upon deciding to buy something, and in most cases, a customer decides to actually buy an item after thoroughly looking over the items. Therefore, when entering a shop, most customers do not try to perform an operation for payment purposely without deciding to buy something, and therefore, at registers, many customers who have not been credited in advance make payments, and as a result, an effect of reducing congestion at the registers is limited.

The present invention was made in view of the problem described above, and an object thereof is to provide an electronic payment system with which even without an operation for payment by a customer who has a card etc. for electronic payment, credit processing can be performed in advance based on personal identification information of the card etc. and accordingly, communications with a host are omitted at the time of payment at a register and a payment can be made in a short time.

Solution to Problem

To achieve the above-described object, an electronic payment system according to a first aspect of the present invention comprises: a first communication means for receiving user identification information from an ID storage medium storing the user identification information; a crediting means for performing credit processing based on the user identification information; a second communication means for receiving the user identification information from the ID storage medium through shorter-distance communication than the first communication means; and a charging means for receiving the user identification information by the second communication means, and performs charge processing based on the received user identification information after confirming that a credit is given by the crediting means based on the received user identification information.

In an electronic payment system according to a second aspect of the present invention, the first communication function is a communication function using wireless LAN. Accordingly, a general-purpose middle-distance communication function can be used.

In an electronic payment system according to a third aspect of the present invention, the second communication function is a short-distance communication function using radio waves. Accordingly, a payment can be made by a simple user operation.

Advantageous Effects of Invention

According to the electronic payment system of the present invention, a time for communication between a payment server and a payment terminal at the time of payment is not necessary, and a time during which a user occupies the payment terminal becomes short. The middle-distance communication function is used for crediting, and the short-distance communication function is used for payment, so that a user is not required to perform an operation for credit processing, and at the time of payment, a specific user can be reliably identified and charged.

REFERENCE SIGNS LIST

| | |
|---|---|
| 1 | Portable telephone |
| 2 | Payment terminal |
| 3 | Shop server |
| 4 | Payment server |
| 5 | Admission terminal |
| 11 | Non-contact IC card |
| 12 | Bluetooth communication function |
| 21 | Admission terminal |
| 31 | Communication function |
| 32 | Control function |
| 33 | Authentication information memory |
| 34 | Upper limit amount memory |
| 35 | Payment details memory |
| 36 | Additional information memory |
| 37 | Timer |
| 41 | Communication function |
| 42 | Control function |
| 43 | Payment database |
| 51 | Communication function |
| 200 | Automatic ticket gate |
| 201 | Communication function |
| 300 | Station server |
| 320 | Control function |

DESCRIPTION OF EMBODIMENTS

Hereinafter, a best mode for carrying out the present invention will be described in detail with reference to the accompanying drawings.

EXAMPLE 1

Figure 1:
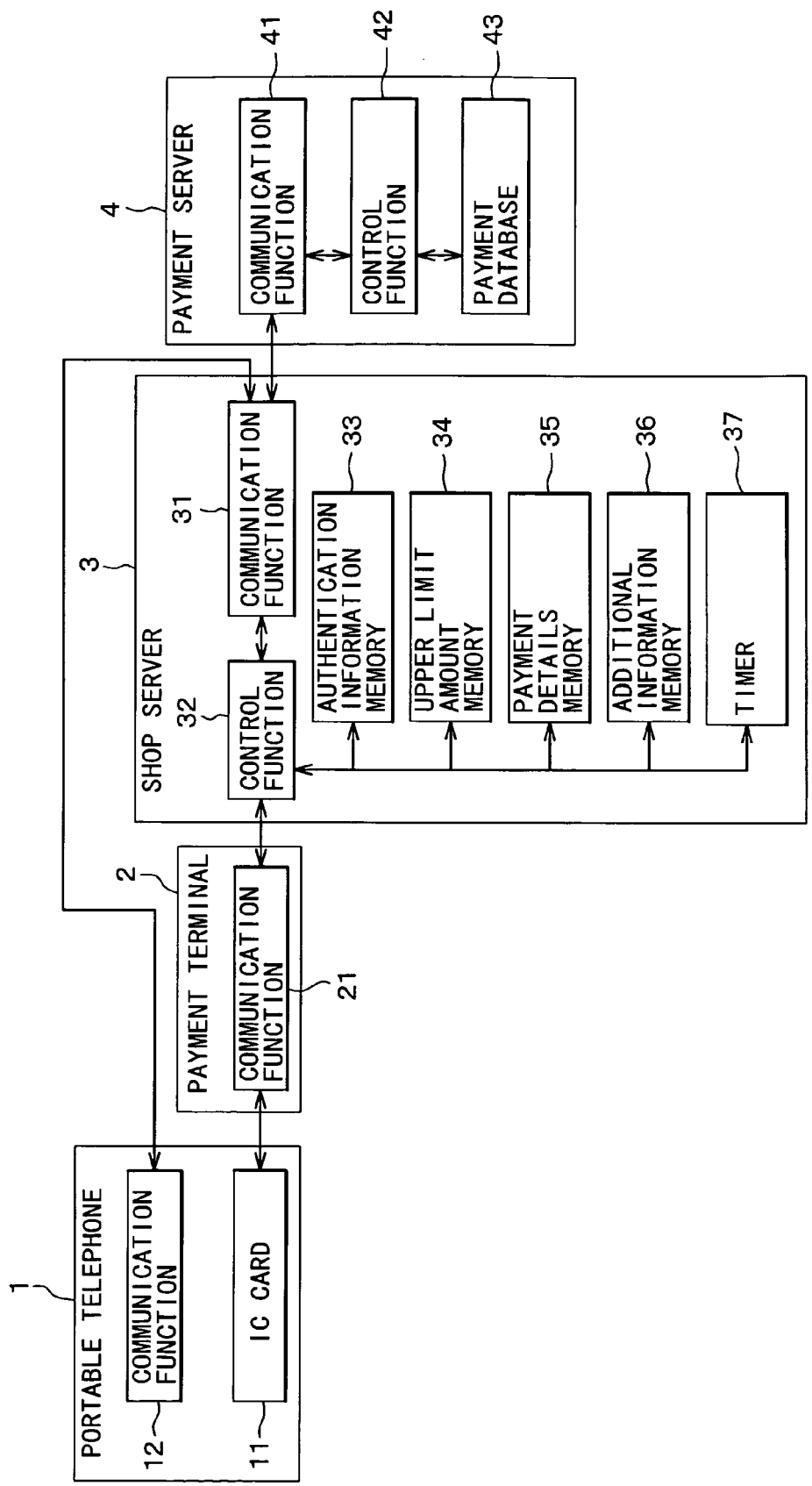
FIG. 1 is a view showing a configuration of an electronic payment system of Example 1 of the present invention.

FIG. 1 is a view showing a configuration of an electronic payment system of Example 1 of the present invention. The electronic payment system of this Example 1 comprises a payment terminal 2 and a shop server 3. A portable telephone 1 is a portable telephone in which a non-contact IC card 11 and a Bluetooth communication function 12 are installed. The payment terminal 2 and the shop server 3 are installed in the same shop.

The payment terminal 2 has a short-distance communication function 21, and exchange information necessary for payment steps described later with the non-contact IC card 11 by communicating with the non-contact IC card 11 by moving the non-contact IC card 11 closer to the payment terminal 2, is possible.

The shop server 3 comprises a communication function 31, a control function 32, an authentication information memory 33, an upper limit amount memory 34, a payment details memory 35, an additional information memory 36, and a timer 37. The control function 32 controls functional operations of the shop server 3, and can exchange information with the portable telephone 1 via the Bluetooth communication function 12 of the portable telephone 1 by the communication function 31, and can also exchange information with the payment server 4 as well.

The payment server 4 comprises a communication function 41, a control function 42, and a payment database 43. In the payment database 43, authentication data C including ID symbols A of the portable telephones 1 and ID symbols B of the non-contact IC cards 11, etc., usable upper limit amounts D, and payment histories E of users, etc. are stored on a user basis (see Table 1).

TABLE 1

| Authentication data (C) | | | |
|---|---|---|---|
| Portable telephone ID (A) | Card ID (B) | Usable upper limit amount (D) | Payment history (E) |
| CGI | ACF | ¥20,000 | ... |
| CKM | UWZ | ¥5,000 | ... |
| ... | ... | ... | ... |

The control function 42 controls functional operations of the payment server 4, and can exchange data with the control function 32 of the shop server 3 via the communication function 41 and the communication function 31.

Figure 2:
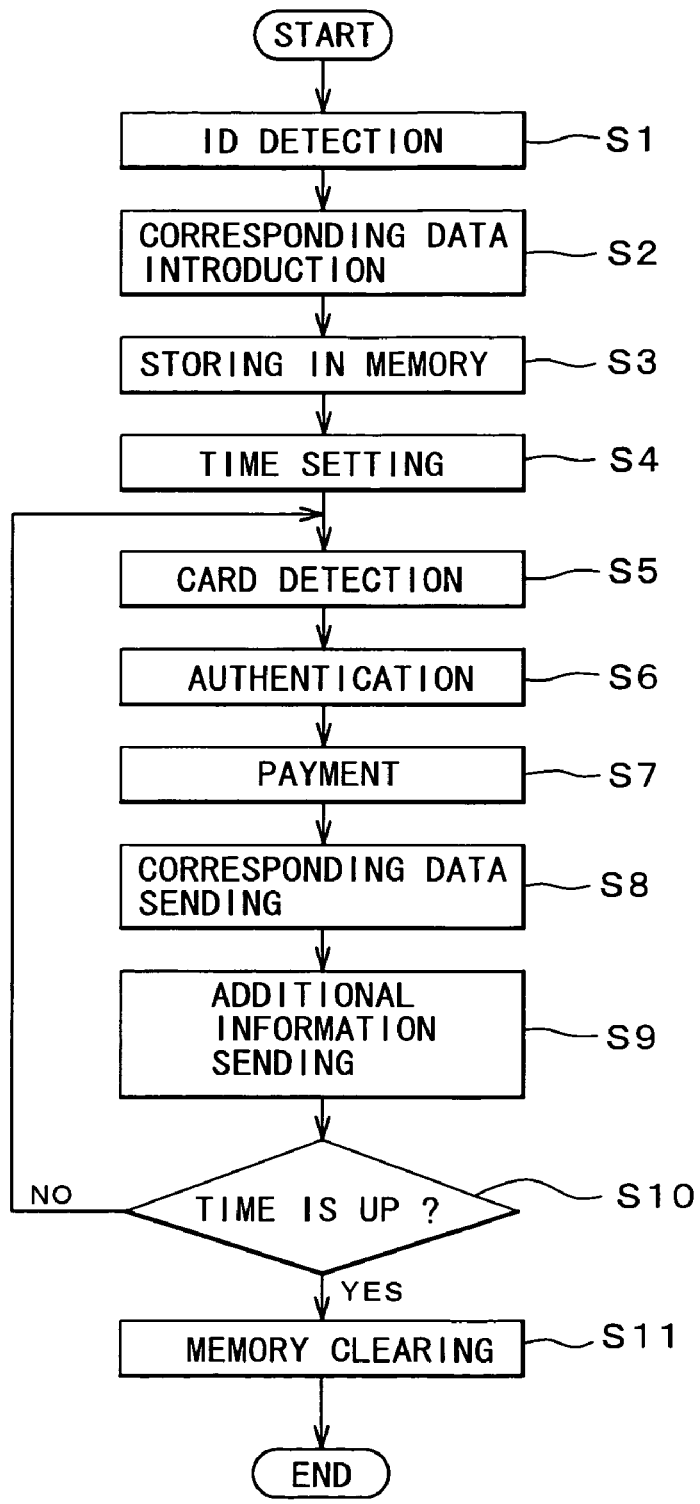
FIG. 2 is a flowchart describing operations of the electronic payment system of Example 1 of the present invention.

FIG. 2 is a flowchart showing operations of the control function 32 of the shop server 3. Hereinafter, operations of the electronic payment system of the present invention will be described in detail with reference to FIG. 1 and FIG. 2.

In an ID detection step S1 of FIG. 2, the control function 32 detects entrance of a user into the shop by making so-called polling communication to call the Bluetooth communication function 12 installed inside the portable telephone 1 carried by the user who visits the shop via the communication function 31, and automatically detects an ID symbol A of the portable telephone 1 by communicating with it. In this case, the user is not required to perform some operation to connect the portable telephone 1 to the control function 32 via the communication function 31.

In a corresponding data introduction step S2, the control function 32 communicates with the control function 42 via the communication function 31 and the communication function 41, and introduces user data corresponding to the ID symbol A of the portable telephone 1 detected in the ID detection step S1 from the payment database 43.

In a memory storing step S3, the control function 32 stores authentication data C including the ID symbol A of the portable telephone 1 and an ID symbol B of the non-contact IC card and a usable upper limit amount D of electronic money permitted by the non-contact IC card 11 in the authentication information memory 33 and the upper limit amount memory 34, respectively, from the user data introduced in the corresponding data introduction step S2.

In a time setting step S4, the control function 32 sets the timer 37 for a predetermined time G, and starts monitoring the elapse of the time.

Credit processing is completed through the above-described ID detection step S1 to the time setting step S4. In other words, in the authentication information memory 33 and the upper limit amount memory 34 of the shop server 3, the authentication data C including the ID symbol B of the non-contact IC card 11 and the usable upper limit amount D of electronic money of the non-contact IC card 11 are stored, respectively, so that preparations for enabling authentication of the non-contact IC card 11 and a payment of purchase without searching for and referring to corresponding user data in the payment database of the payment server 4, are made.

In a card detection step S5, the control function 32 waits and detects that the user of the portable telephone 1 has moved the non-contact IC card 11 closer to the payment terminal 2 to buy something, and reads the ID symbol B of the non-contact IC card 11 via the communication function 21.

In an authentication step S6, the control function 32 confirms that the ID symbol B of the non-contact IC card 11 detected by the payment terminal 2 and the ID symbol B stored in the authentication information memory 33 match each other, and then authenticates the non-contact IC card 11.

In a payment step S7, the control function 32 confirms that the amount of purchase does not exceed the usable upper limit amount D of electronic money of the non-contact IC card 11 stored in the upper limit amount memory 34 and then makes the payment, and stores the resultant payment details data F in the payment details memory 35.

In a corresponding data sending step S8, the control function 32 sends the payment details data F stored in the payment details memory 35 to the control function 42 via the communication function 31 and the communication function 41. The control function 42 which received the payment details data F updates the payment database 43 by using this payment details data F. Accordingly, charging is completed.

In an additional information sending step S9, the control function 32 sends information showing that the payment was correctly made, point information added according to the purchase, and information introducing related goods, etc. to the portable telephone 1 via the communication function 31.

In a time-up judgment step S10, the control function 32 monitors the elapsed time of the timer 37, and when the predetermined time G does not elapse, the control function 32 selects the NO side and returns to the top of card detection step S5 and waits and detects whether another purchase has been made by using the non-contact IC card 11, and after the predetermined time G elapses, the control function 32 selects the YES side and clears all content stored in the authentication information memory 33, the upper limit amount memory 34, the payment details memory 35, the additional information memory 36, and the timer 37 in a memory clearing step S11. Therefore, a purchase by using the non-contact IC card 11 can be made any number of times in the predetermined time G, however, after the predetermined time G elapses, a purchase by using the non-contact IC card 11 cannot be made unless the above-described steps starting from the ID detection step S1 using the portable telephone 1 are taken.

As described in detail above, according to the electronic payment system of the present invention, the ID symbol A of the portable telephone 1 is detected, authentication data C and the usable upper limit amount D of the user are introduced from the payment server 4, and the portable telephone 1 is credited in advance, and further, the steps from the card detection step S5 to the payment step S7 in which the user must use the non-contact IC card 11 and the payment terminal 2 for making a purchase are all performed by the payment terminal 2 and the shop server 3 which are installed in the same shop, so that the time of communication between the control function 32 and the control function 42 via the communication function 31 and the communication function 41 and the processing time of the control function 42 are not needed, so that the time during which the user occupies the payment terminal 2 becomes short.

Further, the Bluetooth communication function 12 as a middle-distance communication function installed inside the portable telephone 1 is used for credit processing of the portable telephone 1, and the short-distance communication function of the non-contact IC card 11 is used for payment, and accordingly, a user operation for credit processing is not needed, and at the time of payment, a specific user can be reliably identified and charged.

Through the time setting step S4 and the time-up judgment step S10, the content stored in the authentication information memory 33, the upper limit amount memory 34, and the payment details memory 35 are held only for the predetermined time G and then cleared, and a user's personal information of the non-contact IC card 11 such as the authentication data C and the usable upper limit amount D are not left stored in the shop server 3, so that this is safe.

The time G may be determined according to the state of the shop and kinds of items lined-up, and preferably, the time G is normally determined to either or an earlier time of several hours and, regardless of the duration, a closing time of a day in which the ID symbol A of the portable telephone 1 is detected through the ID detection step S1.

In the description given above, the non-contact IC card 11 is installed inside the portable telephone 1, however, it may be installed inside a PDA (Personal Digital Assistant) or may be an independent card which is not installed inside the portable telephone 1.

An additional information sending step S9 is an effective means for increasing the ratio of repetition of purchase at the shop by providing points corresponding to an amount of purchase, or increasing the convenience of the shop by introducing related items or sale items, and advertising, however, this step is not always necessary for electronic payment, and may be accordingly omitted or the information may be sent to only a user, who desires this step, of the portable telephone.

In the description given above, by considering that the Bluetooth communication function 12 is used by the control function 32 to automatically detect an ID symbol of the portable telephone 1 by detecting entrance of a user into the shop by making so-called polling communication to always call the Bluetooth communication function 12 via the communication function 31 and communicating with the Bluetooth communication function 12, other communication functions having the same functions as the Bluetooth communication function 12, that is, for example, a wireless LAN communication function can also be used.

As described in detail above, according to the electronic payment system of the present invention, credit processing can be completed in advance before the payment without requiring a user to perform a special operation, and accordingly, the time during which one user occupies the payment terminal 2 can be shortened, and safe and reliable payment can be made in a short time.

EXAMPLE 2

Figure 3:
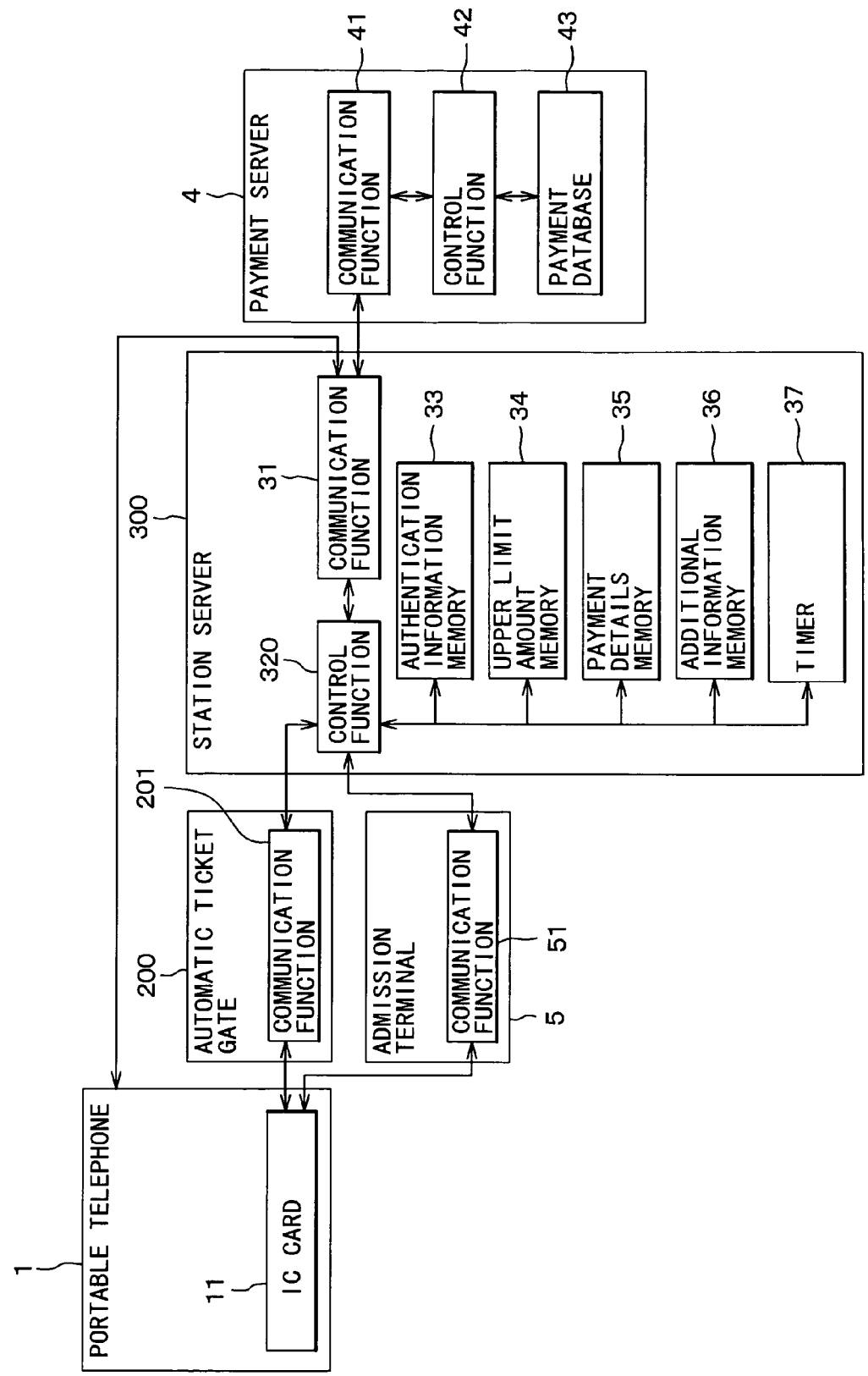
FIG. 3 is a view showing a configuration of an electronic payment system of Example 2 of the present invention.

FIG. 3 is a view showing a configuration of an electronic payment system of Example 2 of the present invention. Example 2 is an example of application to an automatic ticket gate at a station of a train, a subway, or a monorail, etc. The electronic payment system of Example 2 comprises an automatic ticket gate 200, an admission terminal 5, and a station server 300. The Bluetooth communication function 12 of the portable telephone 1 is not used, so that it is not shown. In regard to payment, the automatic ticket gate 200 has the same function as the payment terminal 2 of Example 1, and the payment server 4 has the same function as the payment server 4 of Example 1. The admission terminal 5 is disposed in passage spaces at a distance of approximately 20 m from the automatic ticket gate 200 before and after the automatic ticket gate 200, and has a middle-distance communication function 51, and makes middle-distance communication with the non-contact IC card 11 when a user approaching the automatic ticket gate 200 passes through in front of the admission terminal 5, the admission terminal 5 makes middle-distance communication with the non-contact IC card 11, and detects an ID symbol B of the non-contact IC card 11.

The station server 300 has the same basic configuration as the shop server 3 of the electronic payment system shown in FIG. 1, however, the station server 300 has a difference in which it has a control function 320 instead of the control function 32. The control function 320 has a function to control the admission terminal 5 by being connected to the admission terminal 5 in addition to the function of the control function 32.

Hereinafter, operations of the electronic payment system of Example 2 of the present invention will be described in detail with reference to FIG. 3 and FIG. 2. FIG. 2 is a flowchart showing operations of the control function 32 of the shop server 3 shown in FIG. 1, and in a precise sense, does not show operations of the control function 320 of the station server 300 shown in FIG. 3, however, the control function 320 performs the same operations except for only the following difference, so that the function of the control function 320 of FIG. 3 will be described with reference to the flowchart of FIG. 2 while making apparent the difference in order to prevent the drawing and description of the drawing from becoming complicated.

In an ID detection step S1 of FIG. 2, the control function 320 detects the ID symbol B of the non-contact IC card 11 when the user of the portable telephone 1 who approaches the automatic ticket gate 200 to pass through the automatic ticket gate 200 passes through the front of the admission terminal 5.

In a corresponding data introduction step S2, the control function 320 communicates with the control function 42 via the communication function 31 and the communication function 41, and introduces user data corresponding to the ID symbol B unique to the non-contact IC card 11 detected in the ID detection step S1 from the payment database 43.

In a memory storing step S3, from the user data introduced in the corresponding data introduction step S2, the control function 32 stores authentication data including the ID symbol B of the non-contact IC card 11 and a usable upper limit amount D of electronic money permitted by the non-contact IC card 11 in the authentication information memory 33 and the upper limit amount memory 34, respectively.

Note that, in the payment database 43 of the payment server 4, it is obvious that the ID symbol A of the portable telephone 1 and the ID symbol B of the non-contact IC card 11 belong to the same user, so that the user data to be introduced in the corresponding data introduction step S2 is the same between the configuration of the electronic payment system shown in FIG. 1 and the configuration of the electronic payment system shown in FIG. 3, and data to be stored in the authentication information memory 33 and the upper limit amount memory 34 in the memory storing step S3 are data of the same user.

Therefore, in the configuration of the electronic payment system shown in FIG. 3, the same processing as in the configuration of the electronic payment system shown in FIG. 1 is also performed in the memory storing step S3 to the memory clearing step S11 of the flowchart of FIG. 2.

In other words, the electronic payment system configured as shown in FIG. 1 and the electronic payment system configured as shown in FIG. 3 are different from each other in only a point that the control function 32 introduces user data from the payment database 43 by using the ID symbol A of the portable telephone 1 detected via the communication function 31, and on the other hand, the control function 320 introduces user data of the same user from the payment database 43 by using the ID symbol B of the non-contact IC card 11 detected by the admission terminal 5, and both electronic payment systems can make payments using the non-contact IC card 11 and the payment terminal 2.

As a result, the electronic payment system of Example 2 shown in FIG. 3 also completes credit processing in advance before the payment without requiring the user to perform special operations, and therefore, an electronic payment system which can make a safe and reliable payment in a short time, can be provided.

The present invention is not limited to the above-described examples.

In Examples 1 and 2 of the present invention shown in FIG. 1 and FIG. 3, description is given on the assumption that a payment terminal 2, an automatic ticket gate 200, and a admission terminal 5 are provided, however, it may be configured so that pluralities of these may be provided, and the control function 32 and the control function 320 control these simultaneously or in a time division manner to enable more users to use the electronic payment system simultaneously.

In the electronic payment system configured as shown in FIG. 1, the control function 32 introduces user data by using the ID symbol A of the portable telephone 1, and in the electronic payment system configured as shown in FIG. 3, the control function 320 introduces user data by using the ID symbol B of the non-contact IC card 11, however, another control function capable of introducing user data by using either or both of the ID symbol A of the portable telephone 1 and the ID symbol B of the non-contact IC card 11 may be configured and used.

The non-contact IC card 11 is installed inside the portable telephone 1, however, it may not be installed inside the portable telephone 1 but may be independent, and in the electronic payment system configured as shown in FIG. 3, the portable telephone 1 is used only at the additional information sending step S9, and is not used for authenticating the non-contact IC card 11 and making a payment by using the non-contact IC card 11, so that the portable telephone 1 is unnecessary when the additional information sending step S9 is omitted.

The non-contact IC card 11 is moved closer to the payment terminal 2 and the automatic ticket gate 200 and the ID symbol B of the non-contact IC card 11 is read by these, however, for example, a contact IC card which is used by being inserted in the payment terminal 2 and the automatic ticket gate 200 may also be used, or any ID storage medium such as a magnetic card which stores the ID symbol B so that the stored ID symbol B can be read, can also be used.

The communication medium of the short-distance communication function may be any of radio waves, light, and sonic waves. Radio waves are suitable as the communication medium of the middle-distance communication function.

All publications cited in the present Specification are incorporated as they are as references in the present Specification.

The invention claimed is:

1. An electronic payment system comprising:
    a first communication means for detecting an identification storage medium storing a user identification information and receiving the user identification information from the identification storage medium, wherein detecting and receiving are performed without requiring a user to perform an operation other than movement of the identification storage medium;
    a crediting means for performing credit processing based on the user identification information without requiring a user to perform an operation other than movement of the identification storage medium;
    a second communication means for receiving the user identification information from the identification storage medium through shorter-distance communication than the first communication means; and
    a charging means for receiving the user identification information by the second communication means, and performs charge processing based on the received user identification information after confirming that a credit is given by the crediting means based on the received user identification information.

2. The electronic payment system according to claim 1, wherein the first communication means is a communication means using wireless local area network.

3. The electronic payment system according to claim 1, wherein the second communication means is a short-distance communication means using radio waves.

4. The electronic payment system according to claim 2, wherein the second communication means is a short-distance communication means using radio waves.

\* \* \* \* \*